US008155007B2

(12) United States Patent
Thubert et al.

(10) Patent No.: US 8,155,007 B2
(45) Date of Patent: Apr. 10, 2012

(54) PATH OPTIMIZATION FOR MESH ACCESS POINTS IN A WIRELESS MESH NETWORK (75) Inventors: Pascal Thubert, La Colle sur Loup (FR); Vincent Jean Ribiere, Biot (FR); Patrick Wetterwald, Mouans Sartoux (FR); Neal Dante Castagnoli, Morgan Hill, CA (US)

(73) Assignee: Cisco Technology, Inc., San Jose, CA (US)

( * ) Notice: Subject to any disclaimer, the term of this patent is extended or adjusted under 35 U.S.C. 154(b) by 461 days.

(21) Appl. No.: 11/657,662

(22) Filed: Jan. 25, 2007

(65) Prior Publication Data
US 2008/0181133 A1    Jul. 31, 2008

(51) Int. Cl.
*H04L 12/28*    (2006.01)
(52) U.S. Cl. ........................ 370/238; 370/255
(58) Field of Classification Search .............. None
See application file for complete search history.

(56) References Cited

U.S. PATENT DOCUMENTS

| 7,031,266 | B1 * | 4/2006 | Patel et al. ............... 370/254 |
| 2004/0081152 | A1 | 4/2004 | Thubert et al. |
| 2004/0193728 | A1 | 9/2004 | Doshi et al. |
| 2004/0264379 | A1 * | 12/2004 | Srikrishna et al. ......... 370/238 |
| 2005/0265259 | A1 | 12/2005 | Thubert et al. |
| 2006/0002302 | A1 * | 1/2006 | Bejerano et al. ........... 370/238 |
| 2006/0140123 | A1 | 6/2006 | Conner et al. |
| 2006/0215582 | A1 | 9/2006 | Castagnoli et al. |
| 2006/0227724 | A1 | 10/2006 | Thubert et al. |
| 2006/0227726 | A1 * | 10/2006 | Zuniga et al. ............. 370/254 |
| 2006/0291404 | A1 | 12/2006 | Thubert et al. |
| 2006/0291446 | A1 * | 12/2006 | Caldwell et al. ........... 370/351 |
| 2007/0064673 | A1 * | 3/2007 | Bhandaru et al. .......... 370/351 |

OTHER PUBLICATIONS

U.S. Appl. No. 11/251,765, filed Oct. 18, 2005, Thubert et al.
U.S. Appl. No. 11/273,118, filed Nov. 14, 2005, Meier.
"Deployment Guide: Cisco Mesh Networking Solution", Release 3.2, Cisco Systems, Inc., Text Part No. OL-8470-01, pp. 1-GL2 (32 pages).
"Understanding The Lightweight Access point Protocol (LWAPP)", White Paper; Cisco Systems, Inc., 2005, pp. 1-4.
Calhoun et al, "CAPWAP Protocol Specification", <draft-ietf-capwap-protocol-specification-01>, Network Working Group, Internet Draft, May 5, 2006, pp. 1-141.

(Continued)

*Primary Examiner* — Chirag Shah
*Assistant Examiner* — Steve Young
(74) *Attorney, Agent, or Firm* — Leon R. Turkevich (57) ABSTRACT

In one embodiment, a method includes, in each of a plurality of mesh access points, connecting to one of a plurality of mesh controllers in a mesh network and passing connection information to the one mesh controller. The mesh access points include a wired mesh access point having a wired connection to the one mesh controller, and wireless mesh access points having a wireless connection to the one mesh controller via the wired mesh access point. The method also includes generating, in each mesh controller, a corresponding link state table based on the passed connection information from each corresponding connected mesh access point. The method also includes generating in at least one of the mesh controllers a mesh table, identifying all of the connecting links for the mesh access points connected among the mesh controllers, based on the mesh controllers sharing the respective link state tables.

24 Claims, 7 Drawing Sheets

OTHER PUBLICATIONS

Pei et al., Fisheye State Routing: A Routing Scheme for Ad Hoc Wireless Networks:, Proceedings of the IEEE International Conference on Communications, pp. 70-74, New Orleans, LA, Jun. 2000. (Available via World Wide Web at citeseer.ist.psu.edu/article/pei00fisheye.html).

Moy, "OSPF Version 2", Network Working Group, Request for Comments: 2328, Apr. 1998, pp. 1-244.

Loher et al. "Evaluation of Candidate Control and Provisioning of Wireless Access Points (CAPWAP) Protocols", Network Working Group, Request for Comments: 4565, Jul. 2006, pp. 1-31.

* cited by examiner

Controller C1 Link State Table, 80a

| Node i | Adj. Node j | Link ID | Direction (i to j) | Metric |
|---|---|---|---|---|
| 11 | SW1 | L1 ← 20 | 11-SW2 | 1 |
| 11 | 12 | L2 | 11-12 | 2 |
| 11 | 13 | L3 | 11-13 | 2 |
| 12 | 11 | L4 | 12-11 | 2 |
| 12 | 14 | L5 | 12-14 | 2 |
| 13 | 11 | L6 | 13-11 | 2 |
| 13 | 14 | L7 | 13-14 | 2 |
| 14 | 12 | L26 | 14-12 | 2 |
| 14 | 13 | L8 | 14-13 | 2 |
| 14 | 22 | L9 | 14-22 | 3 |

Controller C2 Link State Table, 80b

| Node i | Adj. Node j | Link ID | Direction (i to j) | Metric |
|---|---|---|---|---|
| 21 | SW2 | L10 ← 20 | 21-SW2 | 1 |
| 21 | 22 | L11 | 21-22 | 2 |
| 21 | 23 | L12 | 21-23 | 2 |
| 22 | 21 | L13 | 22-21 | 2 |
| 22 | 14 | L14 | 22-14 | 3 |
| 22 | 23 | L15 | 22-23 | 2 |
| 23 | 21 | L16 | 23-21 | 2 |
| 23 | 22 | L17 | 23-22 | 2 |

Figure 5B

Controller C3 Link State Table, 80c

| Node i | Adj. Node j | Link ID | Direction (i to j) | Metric |
|---|---|---|---|---|
| 31 | SW3 | L18 ← 20 | 31-SW3 | 1 |
| 31 | 32 | L19 | 31-32 | 2 |
| 32 | 31 | L20 | 32-31 | 2 |
| 32 | 33 | L21 | 32-33 | 2 |
| 33 | 32 | L22 | 33-32 | 2 |

Figure 5C

Mesh Table for Mesh Network, 94

| Node i | Adj. Node j | Link ID | Direction (i to j) | Metric |
|---|---|---|---|---|
| 11 | SW1 | L1 ← 20 | 11-SW2 | 1 |
| 11 | 12 | L2 | 11-12 | 2 |
| 11 | 13 | L3 | 11-13 | 2 |
| 12 | 11 | L4 | 12-11 | 2 |
| 12 | 14 | L5 | 12-14 | 2 |
| 13 | 11 | L6 | 13-11 | 2 |
| 13 | 14 | L7 | 13-14 | 2 |
| 14 | 12 | L26 | 14-12 | 2 |
| 14 | 13 | L8 | 14-13 | 2 |
| 14 | 22 | L9 | 14-22 | 3 |
| 21 | SW2 | L10 ← 20 | 21-SW2 | 1 |
| 21 | 22 | L11 | 21-22 | 2 |
| 21 | 23 | L12 | 21-23 | 2 |
| 22 | 21 | L13 | 22-21 | 2 |
| 22 | 14 | L14 | 22-14 | 3 |
| 22 | 23 | L15 | 22-23 | 2 |
| 23 | 21 | L16 | 23-21 | 2 |
| 23 | 22 | L17 | 23-22 | 2 |
| 31 | SW3 | L18 ← 20 | 31-SW3 | 1 |
| 31 | 32 | L19 | 31-32 | 2 |
| 32 | 31 | L20 | 32-31 | 2 |
| 32 | 33 | L21 | 32-33 | 2 |
| 33 | 32 | L22 | 33-32 | 2 |

Figure 9

PATH OPTIMIZATION FOR MESH ACCESS POINTS IN A WIRELESS MESH NETWORK

TECHNICAL FIELD

The present disclosure generally relates to deploying a large scale wireless local area network (WLAN) using wireless link protocols, such as IEEE 802.11 wireless Ethernet, based on implementing a mesh network having distributed mesh access points (MAPs) controlled by a mesh controller.

BACKGROUND

Wireless local area networks are being deployed in large-scale service areas using mesh networking. Mesh networking utilizes "lightweight" mesh access points (MAPs) that communicate with each other over one or more wireless hops (using, for example wireless IEEE 802.11 links), under the control of a WLAN controller. The distribution of the mesh access points extends wireless coverage of the WLAN over a larger coverage area for wireless user devices.

Each mesh access point (MAP) is "lightweight" because its operations are limited to real-time link layer packet transfer, and limited real time media access control (MAC) management operations such as link management, neighbor discovery, and connection to the WLAN controller via a mesh access point having a wired connection to the WLAN controller (i.e., a "Roof-top Access Point"): the WLAN controller centralizes the remaining WLAN management operations on behalf of the mesh access points, including authentication, security management, and mobility. Hence, the MAPs are configured, monitored, and operated from and through the WLAN controller, where each MAP forwards link layer packets to the WLAN controller via a corresponding tunnel between the MAP and the WLAN controller. The WLAN controller then sends the link layer packet to the destination MAP via its corresponding WLAN controller-MAP tunnel. An example mesh network uses Lightweight Access Point Protocol (LWAPP), described for example in the Internet Engineering Task Force (IETF) Request for Comments (RFC) 4565. Another example mesh network is described in the ETF Draft by Calhoun et al., "Control And Provisioning of Wireless Access Points (CAPWAP) Protocol Specification", (draft-ietf-capwap-protocol-specification-01), where a WLAN controller is referred to as an Access Controller (AC).

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

In one embodiment, a method includes, in each of a plurality of mesh access points, connecting to one of a plurality of mesh controllers in a mesh network and passing connection information to the one mesh controller. The mesh access points include a wired mesh access point having a wired connection to the one mesh controller, and wireless mesh access points having a wireless connection to the one mesh controller via the wired mesh access point. The method also includes generating, in each mesh controller, a corresponding link state table based on the passed connection information from each corresponding connected mesh access point. The corresponding link state table identifies connecting links for connecting the corresponding connected mesh access points toward the mesh controller. At least one link state table identifies a wireless neighbor link between one of the connected mesh access points connected to one of the mesh controllers and a corresponding detected neighbor mesh access point connected to another one of the mesh controllers. The method also includes generating in at least one of the mesh controllers a mesh table, identifying all of the connecting links for the mesh access points connected among the mesh controllers, based on the mesh controllers sharing the respective link state tables.

In another embodiment, a method includes receiving, by a mesh controller in a mesh network, connection information from connected mesh access points having connected to the mesh controller. The connected mesh access points include a wired mesh access point having a wired connection to the mesh controller, and wireless mesh access points having a wireless connection to the mesh controller via the wired mesh access point. The method also includes generating, by the mesh controller, a link state table based on the passed connection information, the link state table identifying connecting links for connecting the connected mesh access points toward the mesh controller, and further identifying at least one wireless neighbor link between one of the connected mesh access points and a detected neighbor mesh access point connected to another mesh controller in the mesh network. The method also includes generating in the mesh controller a mesh table based on receiving a corresponding link state table from each other mesh controller in the mesh network. The mesh table identifies all of the connecting links for the mesh access points connected in the mesh network.

In yet another embodiment, an apparatus includes a wired link interface, a memory, and a mesh controller circuit. The wired link interface is configured for receiving connection information from connected mesh access points having connected to the apparatus in a mesh network via a wired connection. The connected mesh access points include a wired mesh access point having connected to the apparatus via the wired connection, and wireless mesh access points having a wireless connection to the apparatus via the wired mesh access point. The memory has a first memory portion and a second memory portion. The mesh controller circuit is configured for operating as a mesh controller in the mesh network. The mesh controller circuit further is configured for generating a link state table in the first memory portion based on the passed connection information. The link state table identifies connecting links for connecting the connected mesh access points toward the apparatus, and further identifies at least one wireless neighbor link between one of the connected mesh access points and a detected neighbor mesh access point connected to another mesh controller in the mesh network. The mesh controller circuit further is configured for generating in the second memory portion a mesh table based on the wired link interface receiving a corresponding link state table from each other mesh controller in the mesh network. The mesh table identifies all of the connecting links for the mesh access points connected in the mesh network.

In yet another embodiment, an apparatus includes a wireless network interface configured for connecting to a mesh controller of a mesh network via a wireless connection with an intermediate mesh access point. The apparatus also includes a mesh access point control circuit configured for sending connection information to the mesh controller that identifies each connection with any neighboring mesh access point including the intermediate mesh access point. The apparatus also includes a memory circuit configured for storing a forwarding table having been received from the mesh controller. The forwarding table specifies destination mesh access points in the mesh network, each destination mesh access point having at least one link identifier for reaching the corresponding destination mesh access point via one of the neighboring mesh access points.

DETAILED DESCRIPTION

Particular embodiments disclosed herein can implement a large-scale wireless local area network (WLAN) using wireless link protocols, such as IEEE 802.11 wireless Ethernet, where a mesh network has distributed mesh access points, including wireless mesh access points and wired access points. Each of the mesh access points can connect to one of a plurality of mesh controllers according to a prescribed lightweight access point protocol; each connected mesh access point also can supply connection information to the mesh controller via a tunnel established between the connected mesh access point and the mesh controller. Each mesh controller can generate a link state table that includes the connection information passed from each of the connected mesh access points having connected to the mesh controller. The mesh controllers can share their respective link state tables, enabling at least one of the mesh controllers to generate a mesh table that identifies all of the connecting links for the mesh access points in the mesh network.

Each mesh controller also can calculate an optimized path for reaching each corresponding connected mesh access point, based on the mesh table. The optimized paths for reaching each of the connected mesh access points can be parsed in order to create forwarding table entries for each mesh access point identified in an optimized path, enabling the forwarding table entries for a given connected mesh access point to be accumulated in order to generate a forwarding table for use by the connected mesh access point. The forwarding table can then be supplied to the corresponding connected mesh access point by the mesh controller, enabling the mesh access point to forward packets, using its supplied forwarding table, according to the optimized paths calculated by the mesh controllers.

Hence, routing protocols can be implemented in the mesh network by the mesh controllers, minimizing the processing requirements of the mesh access points.

Figure 1:
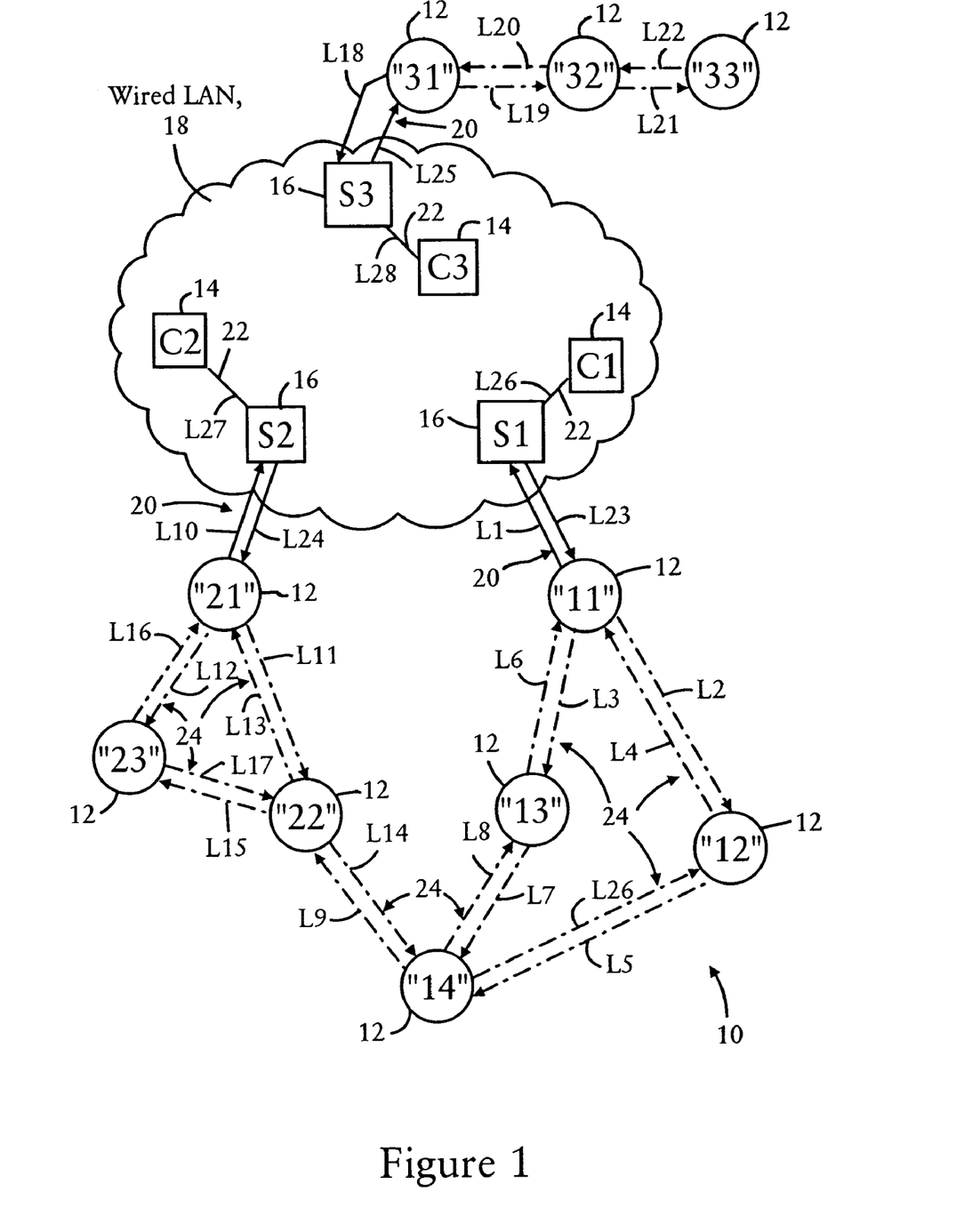
FIG. 1 illustrates an example mesh network including mesh controllers controlling respective groups of mesh access points, according to an example embodiment.

FIG. 1 illustrates an example mesh network 10, according to an example embodiment. The mesh network 10 includes a plurality of mesh access points (MAPs) 12 and mesh controllers 14. Each mesh access point 12, implemented for example using the commercially-available Cisco Aironet Series 1500 Mesh Access Point from Cisco Systems, San Jose, Calif., can be configured for connecting to one of the mesh controllers 14 according to a prescribed lightweight access point protocol, for example the Lightweight Access Point Protocol (LWAPP) described previously with respect to RFC 4565. For example, the mesh access points "11", "12", "13", and "14" 12 each can connect to the mesh controller "C1" 14, the mesh access points "21", "22", and "23" can connect to the mesh controller "C2" 14, and the mesh access points "31", "32", and "33" can connect to the mesh controller "C3", each according to the LWAPP protocol. The term "connecting to the mesh controller" 14 refers to the mesh access point 12 establishing a tunnel with the corresponding controller 14 using one or multiple link layer connections: the mesh access point "12", for example, "connects to" the mesh controller "C1" via the wireless link "L4" to the mesh access point "11", the wired link "L1" to the link layer switch "S1", and the wired link "L26" to the controller "C1" 14; hence, the mesh access point "12" connects to the mesh controller 14 via the links "L4", "L1", and "L26". An example mesh controller 14 is the commercially-available Cisco Aironet Series 4100, 4000, or 2000 Wireless LAN Controller from Cisco Systems, Inc.

The mesh network 10 includes both wired links 20 and wireless links 24. The wired links "L1", "L10", "L18", "L23", "L24", and "L25" 20 connecting the mesh access points "11", "21", and "31" to the wired local area network (LAN) 18 are unidirectional wired links, and the wired links "L26", "L27" and "L28" 22 connecting the controllers 14 to the switches 16 within the wired local area network 18 are illustrated as bidirectional wired links for simplicity: each of the wired links 20 and 22 are illustrated in FIG. 1 as solid lines between the network nodes. The wireless links 24 in FIG. 1 are illustrated by the dashed lines between mesh access points.

The mesh access points "11", "21", and "31" can identify themselves as wired mesh access points based on detecting the respective wired unidirectional links "L1" and "L23" (for MAP "11"), "L10" and "L24" (for MAP "21"), and "L18" and "L25" (for MAP "31"). If a given mesh access point 12 does not have a wired connection to the wired LAN 18, then the mesh access point 12 establishes a wireless connection with the nearest wired mesh access point (e.g., "11", "21", or "31"), or with the nearest available wireless mesh access point.

As illustrated in FIG. 1, the wireless mesh access point "14" can establish multiple wireless connections with the mesh access points "12", "13", and "22"; however, each mesh access point 12 will connect only to one of the mesh controllers 14, for example according to a prescribed configuration or pre-existing assignment, or based on a dynamic selection protocol according to load balancing, etc. Hence, the mesh access point "14" is illustrated herein as connecting to the mesh controller "C1", enabling the mesh controller "C1" to perform routing protocol operations on behalf of the connected mesh access point "14", including updating link state tables, calculating optimized paths for reaching the connected mesh access point "14", and creating and supplying to the connected mesh access point "14" a forwarding table for forwarding packets to other mesh access points 12 in the mesh network 10 according to the respective optimized paths for those destinations.

As described below, each of the mesh access points 12 can be configured for sending connection information to its corresponding mesh controller 14, where the connection information includes link layer information that identifies neighboring mesh access points that are reachable via the mesh access point 12. For example, the mesh access point "14" can send to its mesh controller "C1" link identifiers, link status, link direction, and link cost information for each of its unidirectional wireless links "L5", "L7", "L8", "L9", "L14", and "L26" that connect the mesh access point "14" to the mesh access points "12", "13", and "22". The mesh controllers 14 each generate a corresponding link state table based on the passed connection information from the connected mesh access points: the mesh controllers 14 each exchange the link state tables according to a prescribed link state protocol, for example OSPF according to RFC 2178, enabling any one of the mesh controllers 14 to generate a mesh table that identifies all of the connecting links 20 and 24 for the mesh access points 12 connected in the mesh network 10. The mesh table can then be used for path optimization, described below.

Figure 2:
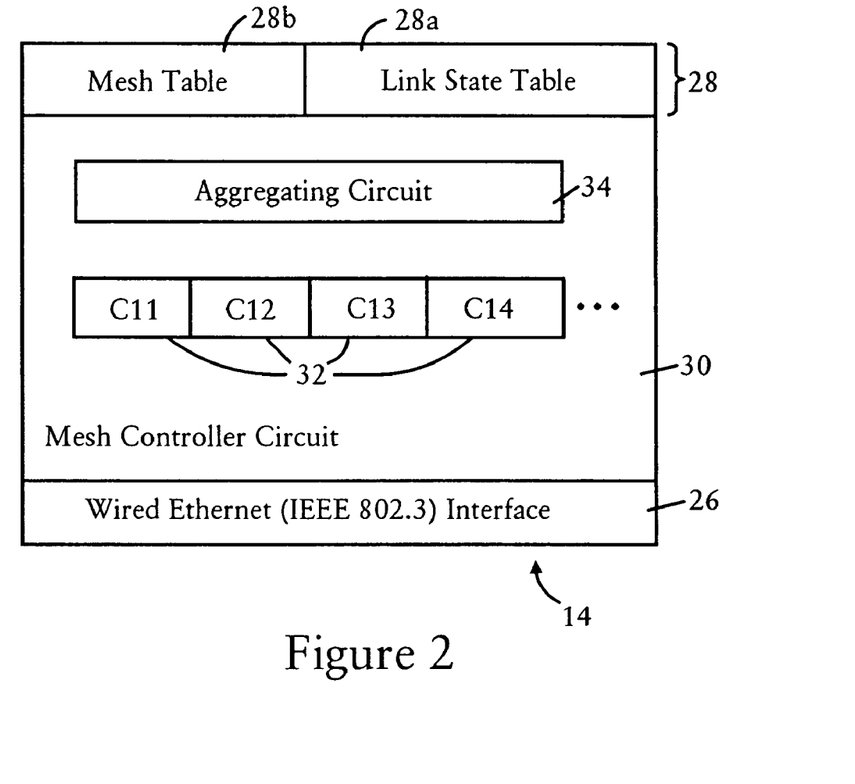
FIG. 2 illustrates an example mesh controller in the system illustrated in FIG. 1.

FIG. 2 illustrates an example mesh controller 14 according to an example embodiment. The mesh controller 14 includes a wired link interface 26, a memory configured for storing link data, and a mesh controller circuit 30. The wired link interface 26 can be implemented, for example, as an Ethernet (IEEE 802.3) 100 Mb per second or Gigabit interface. The memory 28 has a first memory portion 28a for storing a link state table generated by the mesh controller circuit 30, and a second memory portion 28b for storing a mesh table either generated by the mesh controller circuit 30 or received from another mesh controller 14, described in further detail below.

The mesh controller circuit 30 can be implemented in multiple forms, including hardware logic that is implemented in a logic array such as a programmable logic array (PLA), a field programmable gate array (FPGA), or an application-specific integrated circuit (ASIC); the mesh controller circuit 30 also can be implemented using a software-based executable resource that is executed by a processor (not shown) in the mesh controller 14, where execution of executable code stored in nonvolatile memory (not shown) in the mesh controller 12 causes the processor to store application state variables in processor memory, creating an executable application resource (e.g., an application instance) that performs the operations of the mesh controller circuit as described herein. Hence, use of the term "circuit" in this specification refers to both a hardware-based circuit that includes logic for performing the described operations, or a software-based circuit that includes a reserved portion of processor memory for storage of application state data and application variables that are modified by execution of the executable code by a processor.

The mesh controller circuit 30 includes a plurality of mesh controller circuit portions 32, also referred to herein as mesh access point (MAP) controllers or mesh access point controller resources, each configured for performing mesh controller operations for a corresponding one of the connected mesh access points 12. For example, assuming the mesh controller 14 illustrated in FIG. 2 is the mesh controller "C1", the MAP controller "C11" 32 can be assigned to the mesh access point "11", etc., such that the MAP controllers "C11", "C12", "C13" and "C14" 32 perform mesh controller operations on behalf of the respective assigned mesh access points "11", "12", "13", and "14". As described previously, each of the mesh controller circuit portions (i.e., MAP controllers or MAP controller resources) 32 can be implemented either as a hardware-based circuit, a software-based circuit, or some combination thereof. For example, if the mesh controller circuit 30 is implemented as a software-based circuit, each MAP controller or MAP controller resource 32 can be implemented as a reserved portion of memory that is assigned to a connected mesh access point 12 in response to the corresponding connected mesh access point having established a connection with the mesh controller 14; in other words, the mesh controller circuit 30 can instantiate a new instance of the corresponding MAP controller 32 in response to detecting a connection by a corresponding connected mesh access point 12. As described below, example operations performed by the MAP controllers 32 include receiving the connection information from the corresponding connected mesh access point according to the LWAPP protocol, calculating an optimized path to the corresponding connected mesh access point (e.g., a directed acyclic graph generated using link reversal techniques), generating a forwarding table for the corresponding connected mesh access point, and forwarding the forwarding table to the corresponding connected mesh access point via the corresponding tunnel established between the mesh controller 14 and the corresponding connected mesh access point 12.

The mesh controller circuit 30 also includes an aggregating circuit 34 configured for aggregating the connection information from each of the mesh controller circuit portions 32 into the link state table 28a. As described previously with respect to the mesh controller circuit portions 32, the aggregating circuit 34 can be implemented as a hardware-based circuit, a software-based circuit, or some combination thereof.

Figure 3:
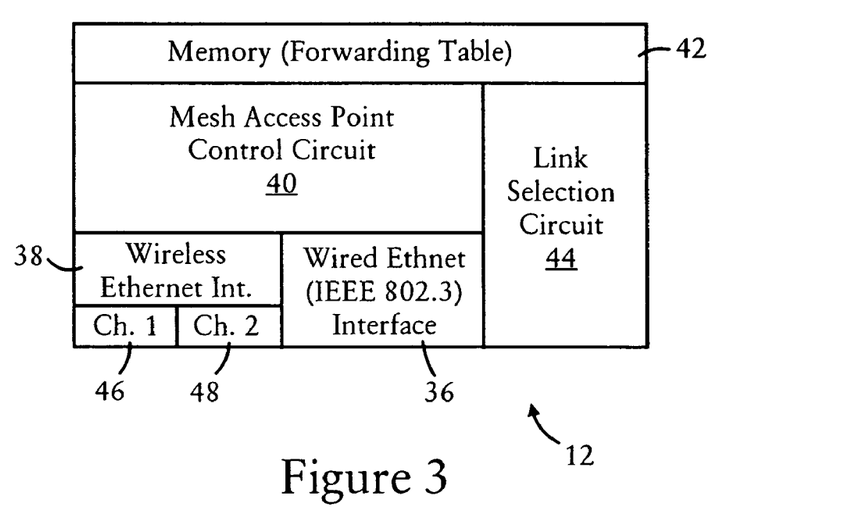
FIG. 3 illustrates an example mesh access point in the system illustrated in FIG. 1.

FIG. 3 illustrates an example mesh access point 12 according to an example embodiment. The mesh access point 12 can include a wired link interface 36, a wireless link network interface 38, a mesh access point control circuit 40, a memory circuit 42, and a link selection circuit 44. If the mesh access point 12 is coupled to the wired local area network 18 via a wired link 20, the mesh access point control circuit 40 can configure the mesh access point 12 as a wired mesh access point, also referred to as a "rooftop access point" (RAP), serving as a root for wireless mesh access points that do not have a wired connection to the mesh controller 14. The wireless network interface 38 utilizes a first wireless channel 46 for establishing wireless links (e.g., IEEE 802.11 links) with other mesh access points 12, also referred to as a "wireless backhaul" link; the wireless network interface 38 utilizes a second wireless channel 48 for establishing wireless links with wireless client devices, for example portable laptop devices, personal digital assistants, etc., also referred to as "user links".

As described below with respect to FIG. 4, the mesh access point control circuit 40 is configured for sending connection information to the mesh controller 14 that identifies each wired or wireless connection with any neighboring mesh access point, including any intermediate mesh access point between itself and the mesh controller 14. The mesh access point control circuit 40 also is configured for storing in the memory 42 a forwarding table having been received from the mesh controller 14 via the corresponding link between the mesh controller 14 and the mesh access point 12. The link selection circuit 44 is configured for selecting an available link for supplying a received user packet to a destination mesh access point based on the forwarding information in the forwarding table 42. As described previously, the mesh access point control circuit 40 and the link selection circuit 44 can be implemented as a hardware-based circuit, a software-based circuit, or some combination thereof.

Hence, the mesh access point 12 is implemented as a "lightweight" device, where routing protocols are not implemented within the mesh access point 12, rather, link state information is supplied to the corresponding mesh controller 14; the mesh controllers 14 execute among themselves the appropriate routing protocols in order to determine optimized paths and forwarding tables for each of the mesh access points 12. Hence, each mesh access point 12 forwards its link state information to its mesh controller 14, and receives from its mesh controller 14 its corresponding forwarding table for implementation of the path optimization having been calculated by the mesh controllers 14.

Figure 4:
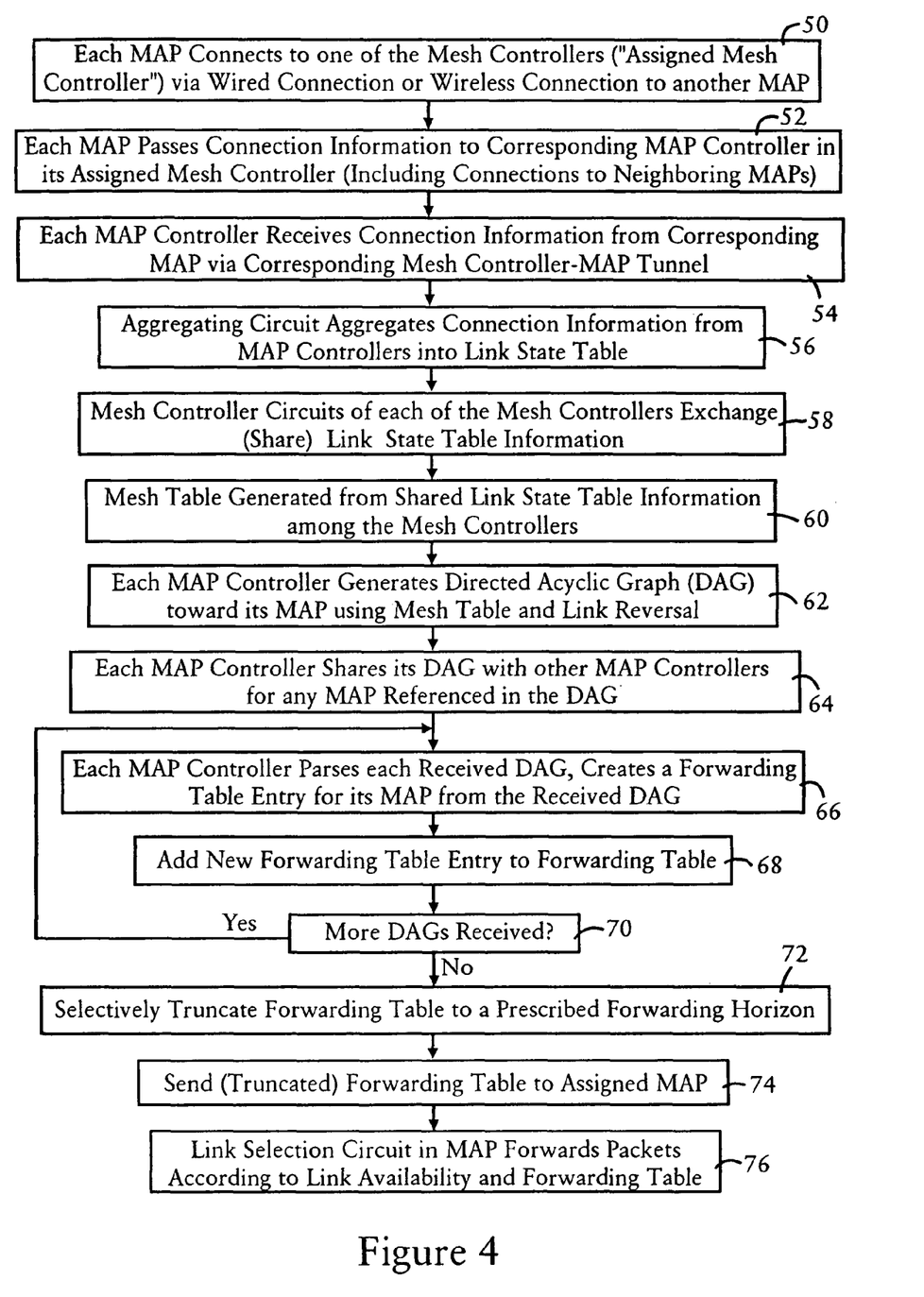
FIG. 4 illustrates an example method for generating a mesh table and optimized paths in the system illustrated in FIG. 1.

FIG. 4 illustrates an example method for generating a mesh table for the mesh network, optimized paths of each mesh access point, and forwarding tables for use by each access point, according to an example embodiment. The operations described herein with respect to FIG. 4 can be implemented as executable code stored on a computer readable medium (e.g., floppy disk, hard disk, EEPROM, CD-ROM, etc.) that are completed based on execution of the code by a processor; the operations described herein also can be implemented as executable logic that is encoded in one or more tangible media for execution (e.g., programmable logic arrays or devices, field programmable gate arrays, programmable array logic, application specific integrated circuits, etc.).

The method begins in step 50, where each mesh access point 12 connects to one of the mesh controllers 14 via a wired connection 20 or a wireless link 24. As described previously, each mesh access point control circuit 40 in a mesh access point 12 is able to determine whether it is a wired mesh access point, for example based on the corresponding wired link interface 36 detecting link activity; similarly, the wireless interface 38 can detect neighboring mesh access points 12, and select one of the mesh access points for establishing a connection to the appropriate mesh controller 14. As described previously with respect to FIG. 1, the mesh access points "11", "12", "13", and "14" 12 each can connect to the mesh controller "C1" 14, the mesh access points "21", "22", and "23" can connect to the mesh controller "C2" 14, and the mesh access points "31", "32", and "33" can connect to the mesh controller "C3", each according to the LWAPP protocol. Each mesh controller 14 responds to a connecting mesh access point 12 by assigning a corresponding mesh controller circuit portion (i.e., a MAP controller) 32, illustrated in FIG. 2.

Each mesh access point (e.g., "14") 12, in response to connecting to its assigned MAP controller (e.g., "C14") 32, sends in step 52 its connection information to its assigned MAP controller 32 via the corresponding MAP-mesh controller tunnel, for example according to a prescribed request and response protocol between the MAP controller 32 and the MAP control circuit 40. The MAP-mesh controller tunnel can be terminated on one end by the MAP control circuit 40 in the MAP (e.g., "14"), and on the other end by the corresponding MAP controller (e.g., "C14") 32 in the mesh controller (e.g., "C1") 14. Each MAP controller (e.g., "C14") 32 receives in step 54 the connection information from the corresponding MAP (e.g., "14") 12 via the corresponding MAP-mesh controller tunnel. The aggregating circuit 34 aggregates in step 56 the connection information from each of the MAP controllers 32 in order to generate a link state table which is stored in the memory portion 28a.

Figure 5A:
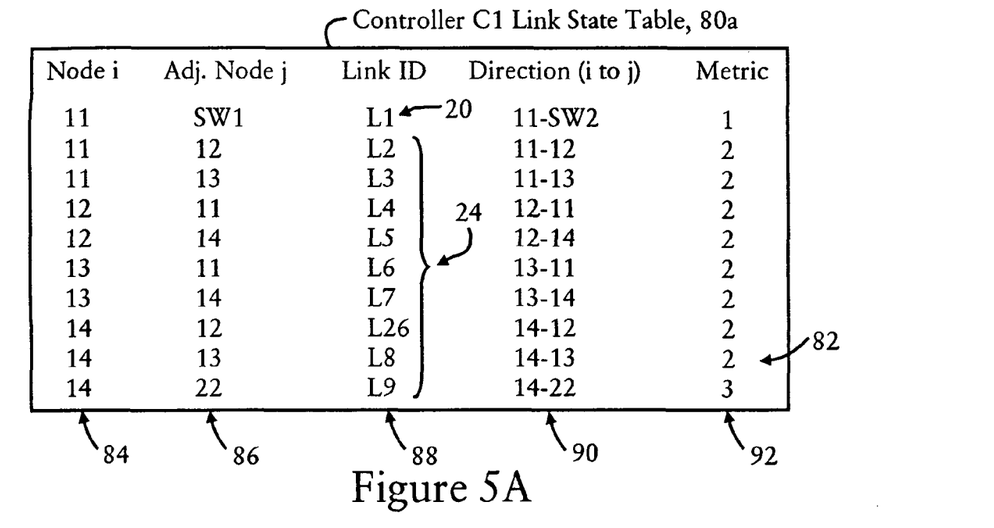
FIGS. 5A, 5B and 5C illustrate example link state tables in the mesh controllers illustrated in FIG. 1.
Figure 5B:
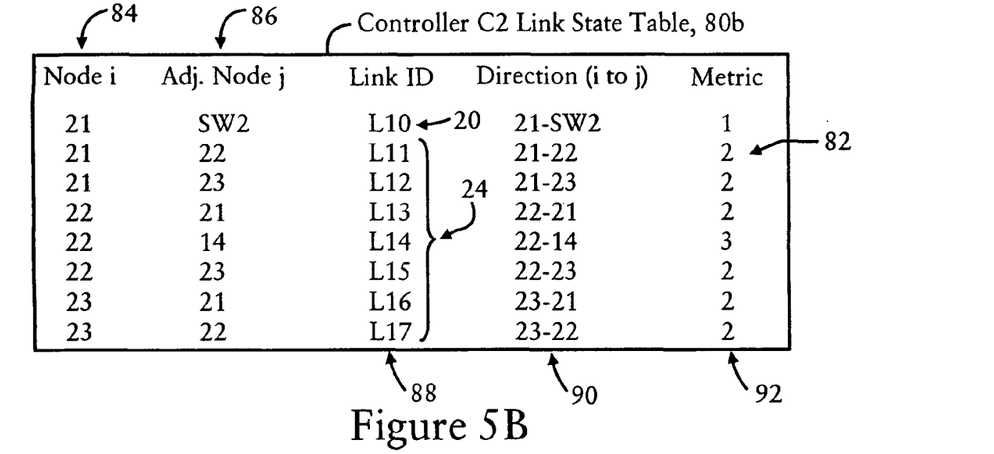
Figure 5C:
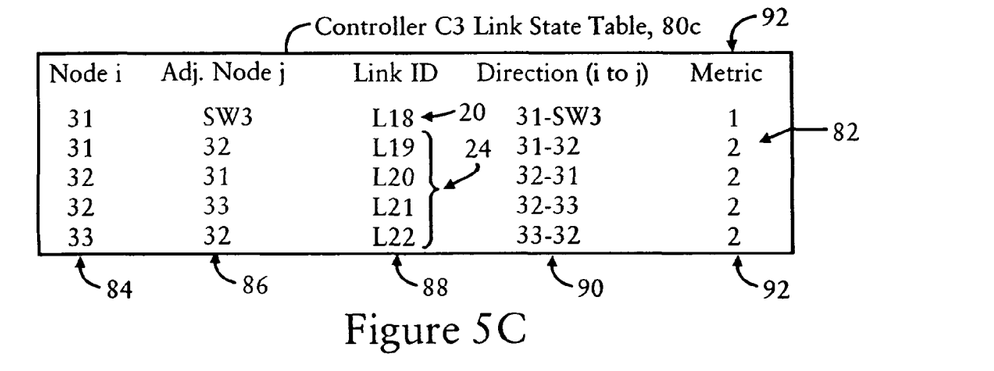

FIGS. 5A, 5B, and 5C illustrate example link state tables 80a, 80b, and 80c that are generated by the respective mesh controllers "C1", "C2", and "C3". Each link state table (e.g., 80a, 80b, or 80c) includes a plurality of link state table entries 82, each link state table entry 82 specifying a corresponding link 20 or 24 that is used by a MAP 12 to connect to the mesh network 10. Each entry 82 includes a node identifier field 84, an adjacent node identifier 86, a corresponding link identifier 88, a corresponding direction identifier 90, and a corresponding cost or metric attribute 92. As described previously, each link state table is formed by the aggregating circuit 34 in each corresponding mesh controller 14 aggregating the connection information received by the MAP controllers 32 from their respective connected MAPs 12.

The link state table 80a also includes an entry 82 that specifies that one of the connected MAPs "14" has a wireless link "L9" with an adjacent MAP "22" that is connected to another mesh controller "C2" in the mesh network 10; similarly, the link state table 80b includes an entry 82 that specifies that one of the connected MAPs "22" has a wireless link "L14" with an adjacent MAP "14" that is connected to another mesh controller "C1" in the mesh network. Hence, optimized paths using the links from neighboring MAPs connected to different mesh controllers 14 cannot be calculated until the information in the link state tables can be combined.

Figure 6:
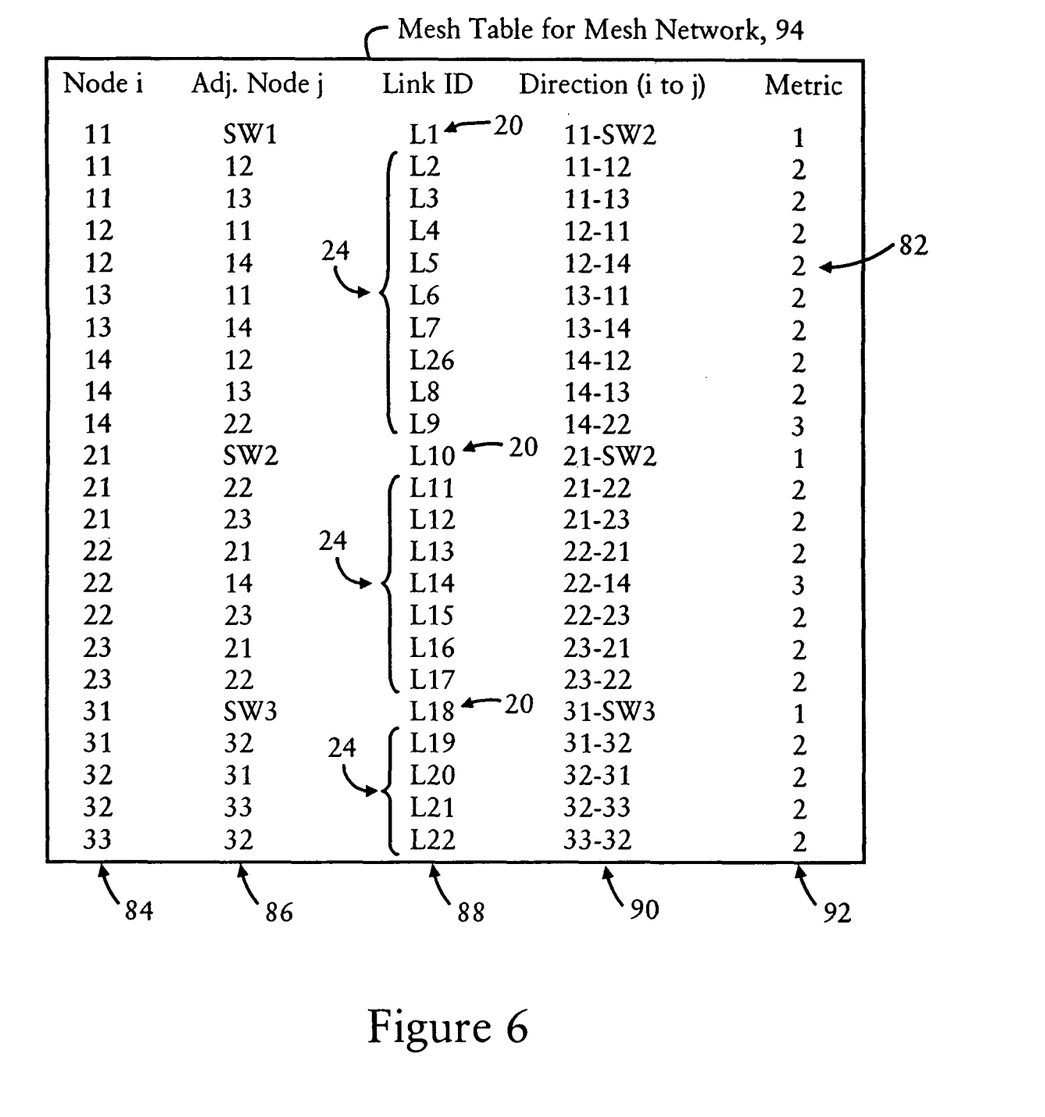
FIG. 6 illustrates an example mesh table in the mesh controller illustrated in FIG. 2.

The mesh controller circuits 30 in each of the mesh controllers 14 exchange in step 58 the link state table information in the link state tables 80a, 80b, and 80c according to a prescribed routing protocol, for example OSPF, enabling any one or all of the mesh controller circuits 30 to generate in step 60 a mesh table 94, illustrated in FIG. 6. As illustrated in FIG. 6, the mesh table 94 identifies all of the connecting links 20 or 24 for the mesh access points 12 connected in the mesh network 10. As described previously with respect to FIG. 2, any one of the mesh controllers 14 may either store the mesh table 94 in its memory portion 28b, or access another mesh controller 14 via the wired LAN 18.

Hence, the mesh controllers 14 are able to implement a link state protocol on behalf of the mesh access points 12, based on the mesh controllers 14 receiving the link state information from the connected mesh access points 12, and the mesh controller circuits 30 executing the routing protocol, including exchanging link state table information in order to create the mesh table 94.

Once the mesh table 94 has been created that identifies all of the connecting links for the mesh access points 12 connected in the mesh network 10, each MAP controller (e.g., "C14") 32 can calculate in step 62 an optimized path for reaching its corresponding assigned MAP (e.g., "14").

Figure 7:
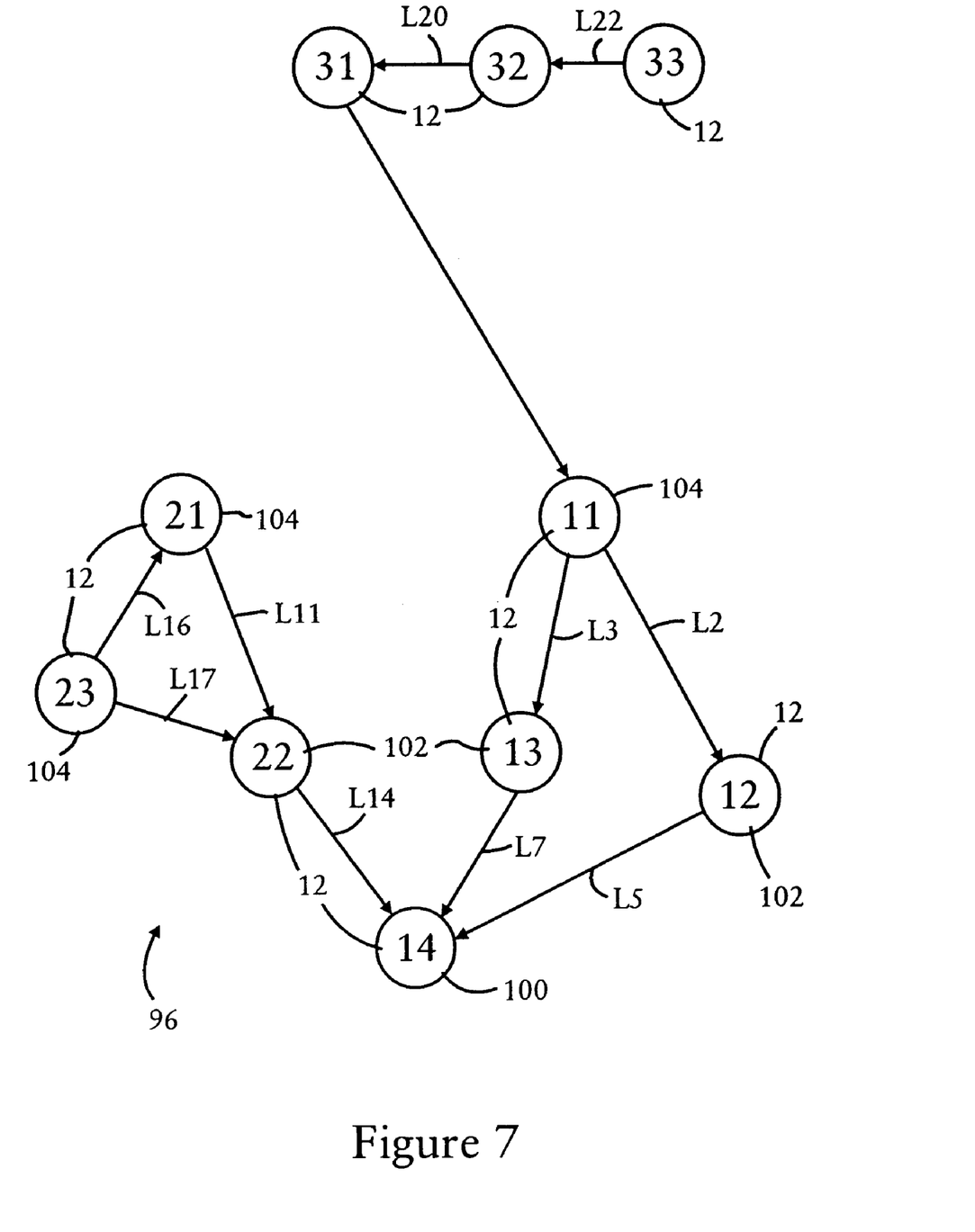
FIG. 7 illustrates an example optimized path generated for one of the mesh access points in one of the example mesh controllers illustrated in FIG. 1.

FIG. 7 illustrates an example optimized path 96 generated in step 62 for the mesh access point "14" by the corresponding assigned MAP controller "C14" 32. The optimized path 96 for the MAP "14" is generated by the corresponding MAP controller "C14" 32 applying a link reversal of the links specified in the mesh table 94. In particular, the optimized path 96 can be generated in the form of a directed acyclic graph (DAG) for the destination "14": a directed graph is acyclic if it contains no cycle or loop, and the DAG 96 maps to a given destination based on the destination having only incoming links: all other nodes that have incoming links also must have outgoing links. An example of a routing algorithm that builds a DAG is the Temporally-Ordered Routing Algorithm (TORA).

Another example for building in step 62 the optimized path 96 of FIG. 7 in the form of the DAG is described in commonly-assigned, copending U.S. patent application Ser. No. 11/251,765, filed Oct. 18, 2005, entitled "Directed Acyclic Graph Computation by Orienting Shortest Path Links and Alternate Path Links Obtained from Shortest Path Computation". In summary, the copending patent application Ser. No. 11/251,761 describes that the directed acyclic graph is generated based on performing a modified Shortest Path First calculation by identifying first adjacent nodes (e.g., "12", "13", "22") 102, or "next-hop nodes", relative to the destination node (e.g., "14") 100, and orienting the links (e.g., "L5", "L7", and "L14") toward the origin "14" 100. Secondary adjacent nodes (e.g., "11", "21", "23") 104 are identified that are adjacent to each of the first adjacent nodes ("12", "13", "22") 102, and attempts are made to extend the paths from the next hop nodes 102 to the associated secondary adjacent nodes 104 while orienting each of the links of the path between the adjacent nodes 102 and the next hop nodes 104 toward the next hop nodes 102 (e.g., links "L2", "L3", "L 11", and "L17"). The operation is repeated until least cost paths can be established from each of the nodes 12 toward the destination 100, using the metrics 92 in the mesh table 94.

Describing step 62 in more detail, the MAP controller "C14" 32 initializes the directed acyclic graph (DAG) computation by initially inserting within a set K (defined as storing chosen nodes) only the origin network node "14" 100 ("14" ∈ K), and emptying a set P that defines chosen paths (P={ }) (the set P is optional and used simply to list the shortest path first (i.e., least cost) paths upon the completion of the DAG computation; the set P can be disregarded if the DAG ordering based on metric and node identifier is not needed). Assuming the set P is to be used, the MAP controller "C14" 32 can store within the set P the source node of the path in N, the destination node in N (i.e., the origin "14") 100, the link identifier(s) 88 between the source and destination nodes, and aggregated path cost (illustrated for example in FIG. 9 with respect to a path from source node "12" to destination nodes "14", "21", "22", "23").

The MAP controller "C14" 32 also initializes the candidate path set C with the paths of nodes that are adjacent to the origin node "14". The candidate path set C includes the source node of the path in N (e.g., MAPs "12", "13", and "22"), the destination node in N (i.e., the origin "14") 100, the link identifiers 88 between the source and destination nodes, and aggregated path cost. The MAP controller "C14" 32 initially adds the first candidate path entries for each next-hop node (i.e., adjacent node) 102 that is adjacent to the origin node 100. Hence, the set C is initially populated with the paths from the MAP "14" to the MAPs "12", "13", and "22".

The MAP controller "C14" 32 orients the link orientation of each of the links in the first candidate path entries toward the origin 100 (i.e., "14"), e.g., by adding to the candidate path entries for "12", "13", and "22" the respective links "L5", "L7", and "L14".

The MAP controller "C14" 32 begins link orientation by selecting the first adjacent node AN[i=1] 102, namely N1 (e.g., "12"), for attempted path extension to any secondary adjacent nodes that are adjacent to the first adjacent node N1. Assuming the set P is used, the least cost path (Least_Path[i]) is removed from the candidate set C; however, if the set P is not to be used, then the entry for N1 is preserved in the candidate set C, in which case a not shortest (NS) flag can be used to distinguish between shortest paths and alternate paths for source nodes to the destination 100.

If the selected adjacent node AN[i=1] (e.g., "12") is not already a member of the set K, the MAP controller "C14" 32 adds the selected adjacent node AN[i=1] to the set K of chosen nodes (N1∈K), and if the set P is in use, adds the least cost path Least_Path[i] to the set P.

The MAP controller "C14" 32 selectively adds a second candidate path entry, for each secondary adjacent node SAN [j] having a link that has not already been oriented. In particular, MAP controller "C14" 32 selects a secondary adjacent node SAN[j] (e.g., "11") 104 that is among secondary adjacent nodes that are a single hop from the selected next-hop node AN[i] (N1) 102. If MAP controller "C14" 32 determines that the link (e.g., "L2") between the selected next-hop node AN[i=1] (N1) and the selected secondary adjacent node SAN[j=1] (N2="11") is not already oriented, the link between the selected next-hop node AN[i=1] (N1="12") and the selected secondary adjacent node SAN[j=1] (N2="11") is oriented toward the selected next-hop node AN[i=1] (N1) 102, and the directional fields 72 associated with the entries for the node pairs N1-N2 via link "L2" in the node adjacency set and the candidate path set.

The MAP controller "C14" 32 also creates a new entry in the candidate path that extends the path sourced by the selected next-hop node AN[i=1] (N1) to the selected secondary adjacent node SAN[j=1] (N2), such that the selected secondary adjacent node SAN[j=1] (N2) is the new path source to the destination "14". Hence, MAP controller "C14" 32 adds a second candidate path entry specifying that the path sourced by the node N2 (N2="11") can reach the destination "14" via the path having directional links "L2" and "L5".

The MAP controller "C14" 32 repeats the path extension from the next-hop node AN[i=1] (N1) for each of the adjacent nodes, resulting in the addition of the respective second candidate path entries. The MAP controller "C14" 32 repeats the path extension for each subsequent next-hop node AN[i=i+1], until all the nodes have been accounted for.

Hence, each MAP controller 32 is able to generate a directed acyclic graph (DAG) 96 for its corresponding MAP 12. The DAG 94 provides load balancing across available multiple paths, and enables link reversal if the last path encounters a link failure. In addition, the DAG 96 can be used to exploit a "Then-Other-Path" (TOP) evaluation, where the DAG is explored by reversing the links from the destination in order to evaluate interference, load, poor link quality, etc., for a given path: this TOP evaluation enables dynamic calculation of a dynamic "ease" factor ("ease" being the inverse of the path "cost"), enabling the MAPs to select the next hop having the best ease factor (least cost) towards the destination in the forwarding table.

Each MAP controller 32, after having generated the directed acyclic graph 96 for its corresponding MAP 12, shares in step 64 its directed acyclic graph 96 with other MAP controllers 32 for any MAP that is referenced in that directed acyclic graph. Each MAP controller (e.g., "C13") 32 in any one of the mesh controllers "C1", "C2", or "C3" 14 that receives the directed acyclic graph (e.g., for destination "14") 96 of another MAP (e.g., "14") from another MAP controller (e.g., "C14"), parses in step 66 the received DAG 96 in order to create a forwarding table entry 106 for its corresponding MAP 12.

Figure 8:
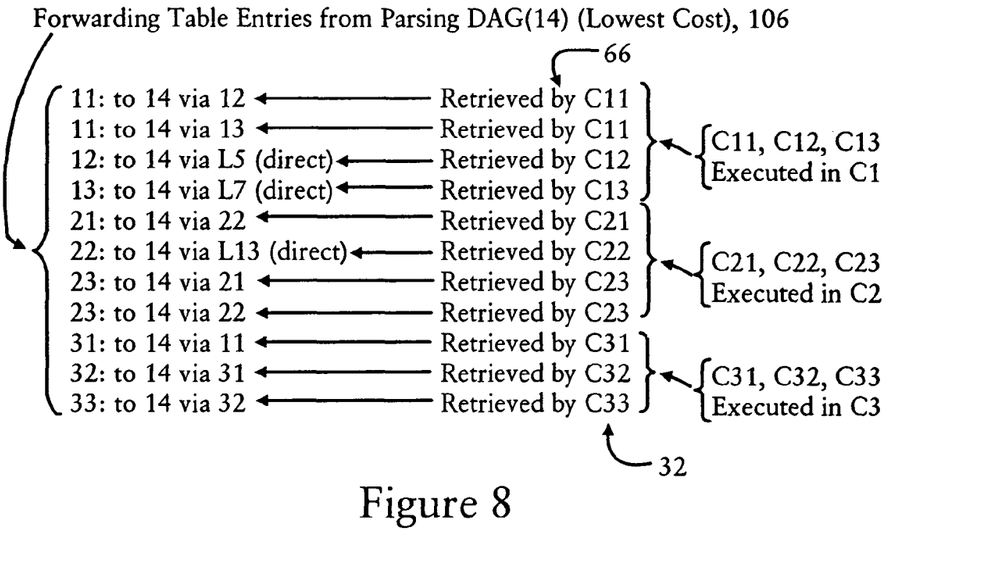
FIG. 8 illustrates example forwarding table entries obtained from parsing the optimized path of FIG. 7.
Figure 9:
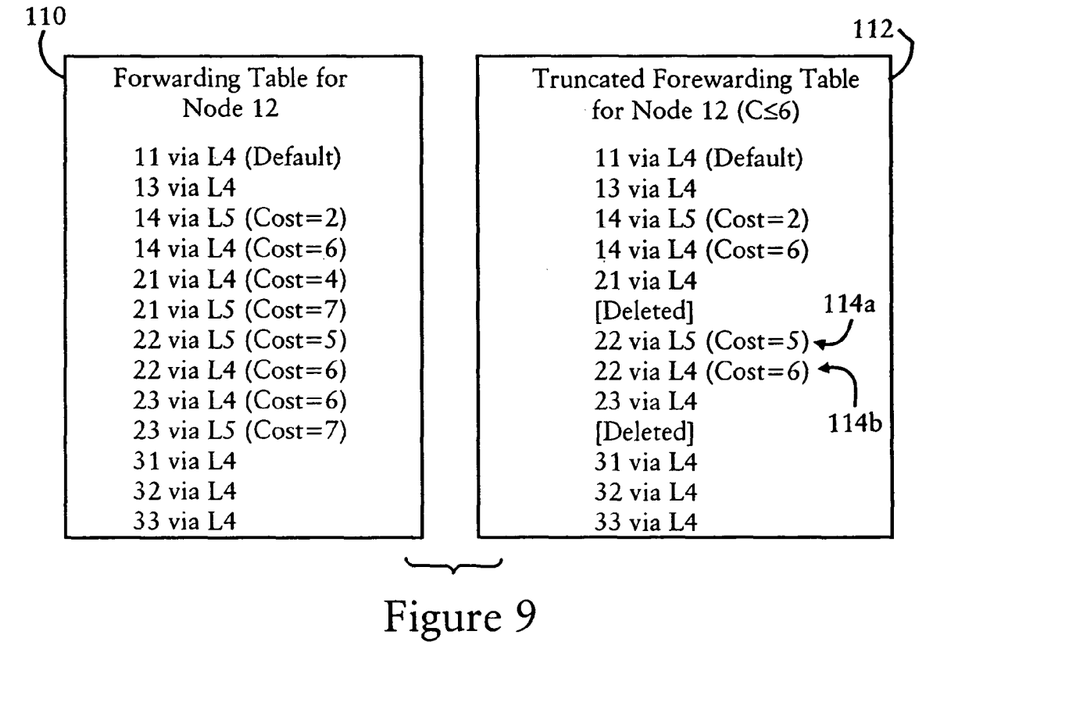
FIG. 9 illustrates example forwarding tables generated for one of the example mesh access points illustrated FIG. 1.

FIG. 8 illustrates the forwarding table entries 106 that are retrieved from the DAG 96 of FIG. 7 by each of the MAP controllers 32 in step 66: each MAP controller 32 parses the received DAG in order to create (i.e., retrieve) the corresponding forwarding table entry 106 for the corresponding mesh access point 12. Each MAP controller 32 adds in step 68 the retrieved forwarding table entry 106 to an accumulated forwarding table 110 for the corresponding MAP 12. The MAP controller 32 repeats in step 70 the parsing of each received DAG 96 in order to retrieve the appropriate forwarding table entry for the corresponding assigned MAP 12. After all the DAGs from other MAP controllers 32 have been received, the resulting forwarding table 110 includes forwarding entries for each destination. As illustrated in FIG. 9, the MAP controller "C12" 32 builds the forwarding table 110 for its corresponding assigned MAP "12" that enables the corresponding assigned MAP "12" to reach any destination in the mesh network 10. As illustrated in FIG. 8, a forwarding table entry 106 can include a cost factor, or alternately an "ease" factor, enabling the MAP to select a path based on the corresponding cost or "ease" factor.

Each MAP controller 32 also can selectively truncate in step 72 the forwarding table 110 to a prescribed forwarding horizon (e.g., a limited number of hops or at a limited cost, for example less than or equal to a cost value of six), resulting in the truncated forwarding table 112. Hence, a type of "fisheye" routing is implemented by the MAP controller 32 in order to reduce the unnecessary complexity of the forwarding table. The truncated forwarding table 112 is forwarded in step 74 to the MAP (e.g., "12") via the corresponding tunnel. The MAP control circuit 40 stores the received forwarding table 112 in its memory portion 42, enabling the link selection circuit 44 to forward packets in step 76 according to link availability and the entries in the truncated forwarding table 112. As apparent from the foregoing, the availability of multiple paths (e.g., 114a, 114b) for the same destination enables the link selection circuit 44 to use alternate links if a given link is unreliable (e.g., encounters link flap).

According to the example embodiments, routing operations are performed by mesh controllers instead of the mesh access points, enabling the mesh access points to receive forwarding tables from the mesh controllers that implements optimized paths based on link state routing algorithms. Hence, each mesh access point can have multiple forwarding solutions that are optimized based on the routing operations performed in the mesh controllers. Further, routing between mesh access points connected to different mesh controllers can be implemented without the necessity of a packet passing through a wired mesh access point (a rooftop access point), since the mesh controllers exchange link state tables in order to generate the mesh table for the mesh network.

What is claimed is:

1. A method comprising:
   in each of a plurality of mesh access points in a local area network implemented as a mesh network, connecting to one of a plurality of mesh controllers in the mesh network and passing connection information to the one mesh controller, the mesh access points including a wired mesh access point having a wired connection to the one mesh controller and wireless mesh access points having a wireless connection to the one mesh controller via the wired mesh access point,
   the wireless mesh access points including first wireless mesh access points each having a wireless link connection with at least the wired mesh access point, and at least one second wireless mesh access point having the corresponding wireless connection via a wireless link connection with at least one of the first wireless mesh access points, wherein routing protocols are not implemented within any of the mesh access points;
   generating, in each mesh controller, a corresponding link state table based on the passed connection information from each corresponding connected mesh access point, the corresponding link state table identifying connecting links for connecting the corresponding connected mesh access points toward the mesh controller, at least one link state table identifying a wireless neighbor link between one of the connected mesh access points connected to one of the mesh controllers and a corresponding detected neighbor mesh access point connected to another one of the mesh controllers;
   generating in at least one of the mesh controllers a mesh table, identifying all of the connecting links for the mesh access points connected among the mesh controllers, based on the mesh controllers sharing the respective link state tables according to a routing protocol that is executed by the mesh controllers on behalf of the mesh access points;
   creating, in each mesh controller, truncated forwarding tables for each of the corresponding connected mesh access points based on the mesh table, the truncated forwarding tables truncated to a prescribed forwarding horizon based on deletion of one or more entries relative to a forwarding table for the corresponding connected mesh access point, at least one of the truncated forwarding tables including first and second entries for reaching a prescribed destination at respective first and second costs; and
   supplying, in each mesh controller, the corresponding truncated forwarding table to the corresponding connected mesh access point via a corresponding tunnel established between said each mesh controller and the corresponding connected mesh access point, the truncated forwarding table enabling said each mesh access point to execute link layer forwarding via a path distinct from the corresponding tunnel.

2. The method of claim 1, further comprising calculating, in each mesh controller, optimized paths for reaching each of the corresponding connected mesh access points based on the mesh table, each of the truncated forwarding tables created based on the optimized paths.

3. The method of claim 2, wherein the creating of truncated forwarding tables includes:
   creating a forwarding table entry based on parsing the optimized paths; and
   accumulating the forwarding table entries for each connected mesh access point to generate the corresponding truncated forwarding table for the connected mesh access point.

4. The method of claim 2, wherein the creating of truncated forwarding tables further includes:
   receiving one of the optimized paths for one of the mesh access points connected to another one of the mesh controllers from the another one of the mesh controllers,
   parsing the one optimized path for additional forwarding table entries for the corresponding connected mesh access points, and
   adding the additional forwarding table entries to the corresponding truncated forwarding table for the connected mesh access point.

5. The method of claim 2, wherein the calculating of the optimized paths includes:
   executing a mesh access point controller resource for each connected mesh access point;
   generating in each mesh access point controller resource a directed acyclic graph for the corresponding connected mesh access point, and
   forwarding by each mesh access point controller resource the directed acyclic graph to other mesh access point controller resources associated with respective other mesh access points identified in the directed acyclic graph.

6. The method of claim 1, wherein the generating in each mesh controller a corresponding link state table includes:
   executing a mesh access point controller resource for each connected mesh access point, and obtaining by each mesh access point controller resource the corresponding connection information from the corresponding connected mesh access point; and
   executing an aggregating resource that aggregates the connection information from the mesh access point controller resources into the link state table.

7. A method comprising:
   receiving, by a mesh controller in a local area network implemented as a mesh network, connection information from connected mesh access points having connected to the mesh controller, the connected mesh access points including a wired mesh access point having a wired connection to the mesh controller and wireless mesh access points having a wireless connection to the mesh controller via the wired mesh access point,
the wireless mesh access points including first wireless mesh access points each having a wireless link connection with at least the wired mesh access point, and at least one second wireless mesh access point having the corresponding wireless connection via a wireless link connection with at least one of the first wireless mesh access points, wherein routing protocols are not implemented within any of the connected mesh access points;
generating, by the mesh controller, a link state table based on the passed connection information, the link state table identifying connecting links for connecting the connected mesh access points toward the mesh controller, and further identifying at least one wireless neighbor link between one of the connected mesh access points and a detected neighbor mesh access point connected to another mesh controller in the mesh network;
generating in the mesh controller a mesh table based on receiving a corresponding link state table from each other mesh controller in the mesh network according to a routing protocol that is executed by the mesh controller on behalf of the connected mesh access points, the mesh table identifying all of the connecting links for the mesh access points connected in the mesh network;
creating truncated forwarding tables for each of the corresponding connected mesh access points based on the mesh table, the truncated forwarding tables truncated to a prescribed forwarding horizon based on deletion of one or more entries relative to a forwarding table for the corresponding connected mesh access point, at least one of the truncated forwarding tables including first and second entries for reaching a prescribed destination at respective first and second costs; and
supplying the corresponding truncated forwarding table to the corresponding connected mesh access point via a corresponding tunnel established between the mesh controller and the corresponding connected mesh access point, the corresponding truncated forwarding table enabling the corresponding connected mesh access point to execute link layer forwarding via a path distinct from the corresponding tunnel.

8. The method of claim 7, further comprising calculating, by the mesh controller, optimized paths for reaching each of the corresponding connected mesh access points based on the mesh table, each of the truncated forwarding tables created based on the optimized paths.

9. The method of claim 8, wherein the creating of truncated forwarding tables includes:
creating a forwarding table entry based on parsing the optimized paths; and
accumulating the forwarding table entries for each connected mesh access point to generate the corresponding truncated forwarding table for the connected mesh access point.

10. The method of claim 8, wherein the creating of truncated forwarding tables further includes:
receiving one of the optimized paths for one of the mesh access points connected to another one of the mesh controllers from the another one of the mesh controllers,
parsing the one optimized path for additional forwarding table entries for the corresponding connected mesh access points, and
adding the additional forwarding table entries to the corresponding truncated forwarding table for the connected mesh access point.

11. The method of claim 8, wherein the calculating of the optimized paths includes:
executing a mesh access point controller resource for each connected mesh access point;
generating in each mesh access point controller resource a directed acyclic graph for the corresponding connected mesh access point, and
forwarding by each mesh access point controller resource the directed acyclic graph to other mesh access point controller resources associated with respective other mesh access points identified in the directed acyclic graph.

12. The method of claim 7, wherein the generating of the link state table includes:
executing a mesh access point controller resource for each connected mesh access point, and obtaining by each mesh access point controller resource the corresponding connection information from the corresponding connected mesh access point; and
executing an aggregating resource that aggregates the connection information from the mesh access point controller resources into the link state table.

13. A method comprising:
connecting, by a wireless mesh access point in a local area network implemented as a mesh network, to a mesh controller of the mesh network via a wireless connection with an intermediate wireless mesh access point, the intermediate wireless mesh access point having a corresponding wireless connection for reaching the mesh controller;
sending, by the wireless mesh access point, connection information to the mesh controller that identifies each connection by the mesh access point with any neighboring mesh access point including the intermediate wireless mesh access point, wherein routing protocols are not implemented within the wireless mesh access point; and
receiving, by the wireless mesh access point and from the mesh controller via a tunnel established between the mesh controller and the wireless mesh access point, a truncated forwarding table that specifies destination mesh access points in the mesh network, the truncated forwarding table created by the mesh controller according to a routing protocol that is executed by the mesh controller on behalf of the wireless mesh access point, the truncated forwarding table truncated by the mesh controller to a prescribed forwarding horizon based on deletion of one or more entries by the mesh controller relative to a forwarding table for the corresponding connected mesh access point, the truncated forwarding table specifying, for each destination mesh access point specified in the truncated forwarding table, at least one link identifier for reaching the corresponding destination mesh access point via one of the neighboring mesh access points, the truncated forwarding table including first and second entries for reaching a prescribed destination at respective first and second costs, the truncated forwarding table enabling the wireless mesh access point to execute link layer forwarding via a path distinct from the corresponding tunnel.

14. The method of claim 13, wherein the truncated forwarding table specifies, for at least one of the destination mesh access points, an alternate link identifier for reaching the corresponding destination mesh access point, the method further including selecting the alternate link identifier based on a determined loss of link connectivity with the one neighboring mesh access point corresponding to the at least one link identifier.

15. An apparatus comprising:
a wired link interface configured for receiving connection information from connected mesh access points having connected to the apparatus via a wired connection in a local area network implemented as a mesh network, the connected mesh access points including a wired mesh access point having connected to the apparatus via the wired connection and wireless mesh access points having a wireless connection to the apparatus via the wired mesh access point,
the wireless mesh access points including first wireless mesh access points each having a wireless link connection with at least the wired mesh access point, and at least one second wireless mesh access point having the corresponding wireless connection via a wireless link connection with at least one of the first wireless mesh access points, wherein routing protocols are not implemented within any of the connected mesh access points;
a memory having a first memory portion and a second memory portion; and
a mesh controller circuit configured for operating as a mesh controller in the mesh network, the mesh controller circuit further configured for generating a link state table in the first memory portion based on the passed connection information, the link state table identifying connecting links for connecting the connected mesh access points toward the apparatus, and further identifying at least one wireless neighbor link between one of the connected mesh access points and a detected neighbor mesh access point connected to another mesh controller in the mesh network;
the mesh controller circuit further configured for generating in the second memory portion a mesh table based on the wired link interface receiving a corresponding link state table from each other mesh controller in the mesh network according to a routing protocol that is executed by the mesh controller on behalf of the connected mesh access points, the mesh table identifying all of the connecting links for the mesh access points connected in the mesh network;
the mesh controller circuit further configured for creating truncated forwarding tables for each of the corresponding connected mesh access points based on the mesh table, each truncated forwarding table truncated by the mesh controller circuit to a prescribed forwarding horizon based on deletion of one or more entries relative to a forwarding table for he corresponding connected mesh access point, at least one of the truncated forwarding tables including first and second entries for reaching a prescribed destination at respective first and second costs, and the mesh controller circuit further configured for supplying the corresponding truncated forwarding table to the corresponding connected mesh access point via a corresponding tunnel established between the mesh controller and the corresponding connected mesh access point, the corresponding truncated forwarding table enabling the corresponding connected mesh access point to execute link layer forwarding via a path distinct from the corresponding tunnel.

16. The apparatus of claim 15, wherein the mesh controller circuit is further configured for calculating optimized paths for reaching each of the corresponding connected mesh access points based on the mesh table, each of the truncated forwarding tables created based on the optimized paths.

17. The apparatus of claim 16, wherein the mesh controller circuit further is configured for creating the truncated forwarding tables based on creating a forwarding table entry based on parsing the optimized paths, and accumulating the forwarding table entries for each connected mesh access point to generate the corresponding truncated forwarding table for the connected mesh access point.

18. The apparatus of claim 16, wherein the mesh controller circuit further is configured for:
receiving one of the optimized paths for one of the mesh access points connected to another one of the mesh controllers from the another one of the mesh controllers;
parsing the one optimized path for additional forwarding table entries for the corresponding connected mesh access points, and
adding the additional forwarding table entries to the corresponding truncated forwarding table for the connected mesh access point.

19. The apparatus of claim 16, wherein:
the mesh controller circuit includes a mesh controller circuit portion for each connected mesh access point;
each mesh controller circuit portion configured for generating a directed acyclic graph for the corresponding connected mesh access point, and forwarding the directed acyclic graph to other mesh controller circuit portions associated with respective other mesh access points identified in the directed acyclic graph.

20. The apparatus of claim 15, wherein the mesh controller circuit comprises:
a mesh controller circuit portion for each connected mesh access point, each mesh controller circuit portion configured for obtaining the corresponding connection information from the corresponding connected mesh access point; and
an aggregating circuit that aggregates the connection information from the mesh controller circuit portions into the link state table.

21. An apparatus comprising:
a wireless network interface configured for connecting to a mesh controller in a local area network implemented as a mesh network and via a wireless connection with an intermediate wireless mesh access point, the intermediate wireless mesh access point having a corresponding wireless connection for reaching the mesh controller;
a mesh access point control circuit configured for sending connection information to the mesh controller that identifies each connection by the apparatus with any neighboring mesh access point including the intermediate wireless mesh access point, wherein routing protocols are not implemented within the apparatus; and
a memory circuit configured for storing a truncated forwarding table having been received from the mesh controller via a tunnel established between the mesh controller and the apparatus, the truncated forwarding table specifying destination mesh access points in the mesh network, the truncated forwarding table created by the mesh controller according to a routing protocol that is executed by the mesh controller on behalf of the apparatus, the truncated forwarding table truncated by the mesh controller to a prescribed forwarding horizon based on deletion of one or more entries relative to a forwarding table for he corresponding connected mesh access point, the truncated forwarding table specifying, for each destination mesh access point specified in the truncated forwarding table, at least one link identifier for reaching the corresponding destination mesh access point via one of the neighboring mesh access points, the truncated forwarding table including first and second entries for reaching a prescribed destination at respective first and second costs, the truncated forwarding table enabling the apparatus to execute link layer forwarding via a path distinct from the corresponding tunnel.

22. The apparatus of claim 21, further comprising a link selection circuit, wherein:
the truncated forwarding table specifies, for at least one of the destination mesh access points, an alternate link identifier for reaching the corresponding destination mesh access point;
the link selection circuit configured for selecting the alternate link identifier based on a determined loss of link connectivity with the one neighboring mesh access point corresponding to the at least one link identifier.

23. An apparatus comprising:
means for receiving connection information from connected mesh access points having connected to the apparatus via a wired connection in a local area network implemented as a mesh network, the connected mesh access points including a wired mesh access point having connected to the apparatus via the wired connection and wireless mesh access points having a wireless connection to the apparatus via the wired mesh access point, the wireless mesh access points including first wireless mesh access points each having a wireless link connection with at least the wired mesh access point, and at least one second wireless mesh access point having the corresponding wireless connection via a wireless link connection with at least one of the first wireless mesh access points, wherein routing protocols are not implemented within any of the connected mesh access points;
means for storing a link state table;
means for executing mesh controller operations in the mesh network, the means for executing configured for generating the link state table based on the passed connection information, the link state table identifying connecting links for connecting the connected mesh access points toward the apparatus, and further identifying at least one wireless neighbor link between one of the connected mesh access points and a detected neighbor mesh access point connected to another mesh controller in the mesh network;
the means for executing further configured for generating a mesh table based on reception of a corresponding link state table from each other mesh controller in the mesh network according to a routing protocol that is executed by the means for executing on behalf of the connected mesh access points, the mesh table identifying all of the connecting links for the mesh access points connected in the mesh network;
the means for executing further configured for creating truncated forwarding tables for each of the corresponding connected mesh access points based on the mesh table, each truncated forwarding table truncated by the means for executing to a prescribed forwarding horizon based on deletion of one or more entries relative to a forwarding table for he corresponding connected mesh access point, at least one of the truncated forwarding tables including first and second entries for reaching a prescribed destination at respective first and second costs, and the means for executing supplying the corresponding truncated forwarding table to the corresponding connected mesh access point via a corresponding tunnel established between the mesh controller and the corresponding connected mesh access point, the corresponding truncated forwarding table enabling the corresponding connected mesh access point to execute link layer forwarding via a path distinct from the corresponding tunnel.

24. An apparatus comprising:
means for connecting to a mesh controller in a local area network implemented as a mesh network and via a wireless connection with an intermediate wireless mesh access point, the intermediate wireless mesh access point having a corresponding wireless connection for reaching the mesh controller;
means for sending connection information to the mesh controller that identifies each connection by the apparatus with any neighboring mesh access point including the intermediate mesh access point, wherein routing protocols are not implemented within the apparatus; and
means for storing a truncated forwarding table having been received from the mesh controller via a tunnel established between the mesh controller and the apparatus, the truncated forwarding table specifying destination mesh access points in the mesh network, the truncated forwarding table created by the mesh controller according to a routing protocol that is executed by the mesh controller on behalf of the apparatus, the truncated forwarding table truncated by the mesh controller to a prescribed forwarding horizon based on deletion of one or more entries relative to a forwarding table for he corresponding connected mesh access point, the truncated forwarding table specifying, for each destination mesh access point in the truncated forwarding table, at least one link identifier for reaching the corresponding destination mesh access point via one of the neighboring mesh access points, the truncated forwarding table including first and second entries for reaching a prescribed destination at respective first and second costs, the truncated forwarding table enabling the apparatus to execute link layer forwarding via a path distinct from the corresponding tunnel.

* * * * *